June 21, 1966  F. J. LUKETA  3,257,008
FISH SORTING TROUGH FOR TRAWLERS
Original Filed Aug. 6, 1962  6 Sheets-Sheet 1

INVENTOR.
FRANK J. LUKETA
BY Graybeal, Cole & Barnard
ATTORNEYS

INVENTOR.
FRANK J. LUKETA

ATTORNEYS

INVENTOR.
FRANK J. LUKETA
BY Graybeal, Cole & Barnard
ATTORNEYS

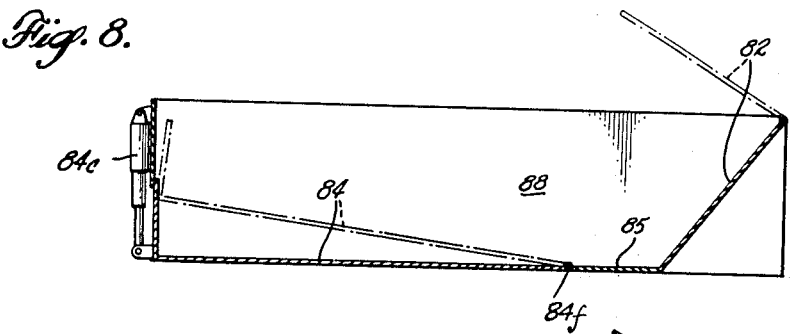
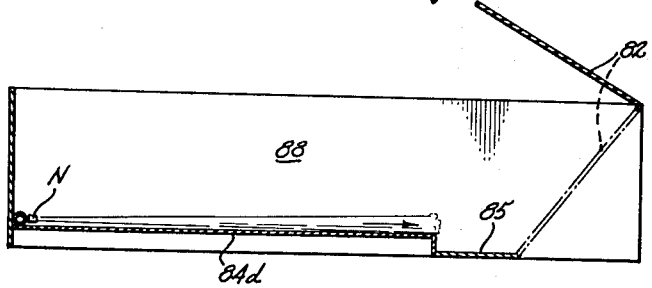
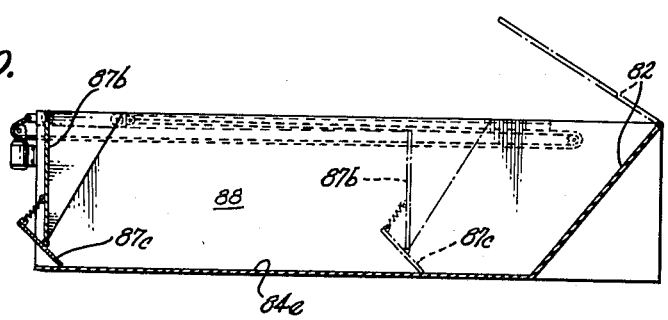
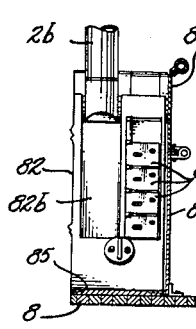
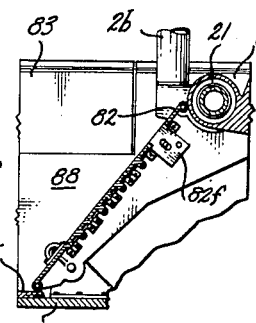
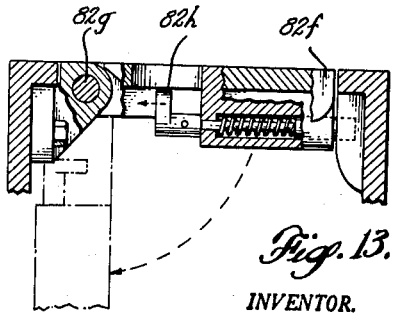
INVENTOR.
FRANK J. LUKETA

United States Patent Office 3,257,008
Patented June 21, 1966

3,257,008
FISH SORTING TROUGH FOR TRAWLERS
Frank J. Luketa, 5567 Greenwood Ave. N.,
Seattle, Wash.
Application Aug. 6, 1962, Ser. No. 215,041, which is a continuation of application Ser. No. 859,389, Dec. 14, 1959, now Patent No. 3,184,080, dated May 18, 1965. Divided and this application Aug. 6, 1964, Ser. No. 394,644
5 Claims. (Cl. 214—15)

This is a division of my copending application Serial No. 215,041, filed August 8, 1962, and now Patent No. 3,184,080, as a continuation of my now-abandoned application Serial No. 859,389, filed December 14, 1959, both of said applications being entitled "Trough for Trawlers."

This invention relates in general to a trawling vessel, or trawler, such as that disclosed in my United States Patent No. 3,065,562, issued November 27, 1962, and entitled "Trawler." More particularly, it concerns a trough or bin installed on the after deck of the trawler for receiving the entire contents of the codend of the trawl net, an arrangement for spilling all first from the after end of the codend into the trough, and the arrangements whereby different species of fish can be segregated and disposed of, the valuable fish into hold spaces and "junk" fish usually overboard, and debris such as mud, rocks, and the like can be cleared from the trough. It concerns also the relationship of such a trough to the usual hatch and hatch cover, such that despite the small deck space or length available, each of the hatch and the trough are of adequate size, but do not interfere, one with the other. The trawler application referred to is particularly concerned with hauling the net aboard the trawler, whereas this application concerns principally disposition of its contents after the net has been hauled aboard and emptied, and, usually, reset.

In general terms, and relative to the segregating function, this invention provides a trough along the keel line, on the open deck, and spaced inboard from the side rails sufficiently that crew members may work alongside it, and of an effective length to occupy substantially all the deck space between the winch and the stern, the whole so arranged that the crew members, one at each side and each standing at one location, can engage, segregate, and distribute the several kinds of fish brought up by a bottom trawl, with a minimum of labor and in minimum time: can clear from a remainder of the catch junk fish which collect on top; can later discharge overboard rocks, mud, and other debris brought up in the net and left in the trough after disposing of the fish, and can swamp out the trough; and when the vessel is not trawling can stow the gear associated with the net-hauling and the fish-segregating operations in convenient manner on or above the deck. If the trawler is engaged in midwater trawling, the catch is likely to be mostly of one kind of fish, and yet the same trough can be used, but a somewhat different distribution arrangement is available, so that the trawler is equally well adapted to either type of operation.

Relative to the relationship between the trough and the hatch, it must be remembered that nets of large capacity, hauled by what is known as the drum trawling method in which the filled codend is hauled on deck over the stern by winding it, in part, upon winch drums well forward on the after deck, require a very considerable length of trough, as much as is required to equal the length of the codend. So much length as is needed is unavailable, between the winch and the stern, except as it includes space usually allocated to the hatch that affords access for icing, discharge of cargo, etc., within the hold. Nevertheless, a fairly large hatch is necessary for such purposes. This invention provides ample length for the trough and space for the hatch, by integrating the hatch with the trough, in such manner that each can be used alternatively (for their conjoint use is never required), and so neither interferes with the other, and deck space is utilized most advantageously.

In addition, this invention provides a means especially adapted to trawling by the drum trawling method, wherein the codend is pulled in over the stern by a drum well forward on the deck, to facilitate spilling of the contents of the codend out its after end, into the trough, yet without any necessity of engaging and hoisting the forward end of the codend, despite the shortness of the deck.

The above summarizes the objects of the invention, except as to details which will appear hereinafter.

The drawings illustrate in detail a preferred form of construction, and diagrammatically several alternative forms.

FIGURES 8, 9 and 10 are diagrammatic longitudinal sections, showing alternative arrangements for the trough, and for clearing it of debris after the catch has been sorted;

FIGURE 11 is a detail vertical cross-sectional view, illustrating an alternative arrangement for quickly and labor-savingly disposing of junk fish that tend to collect on the pile during segregation; FIGURE 12 is a longitudinal vertical sectional view thereof; and FIGURE 13 is an enlarged sectional view transversely through a gate which is part of the same.

Figure 1:
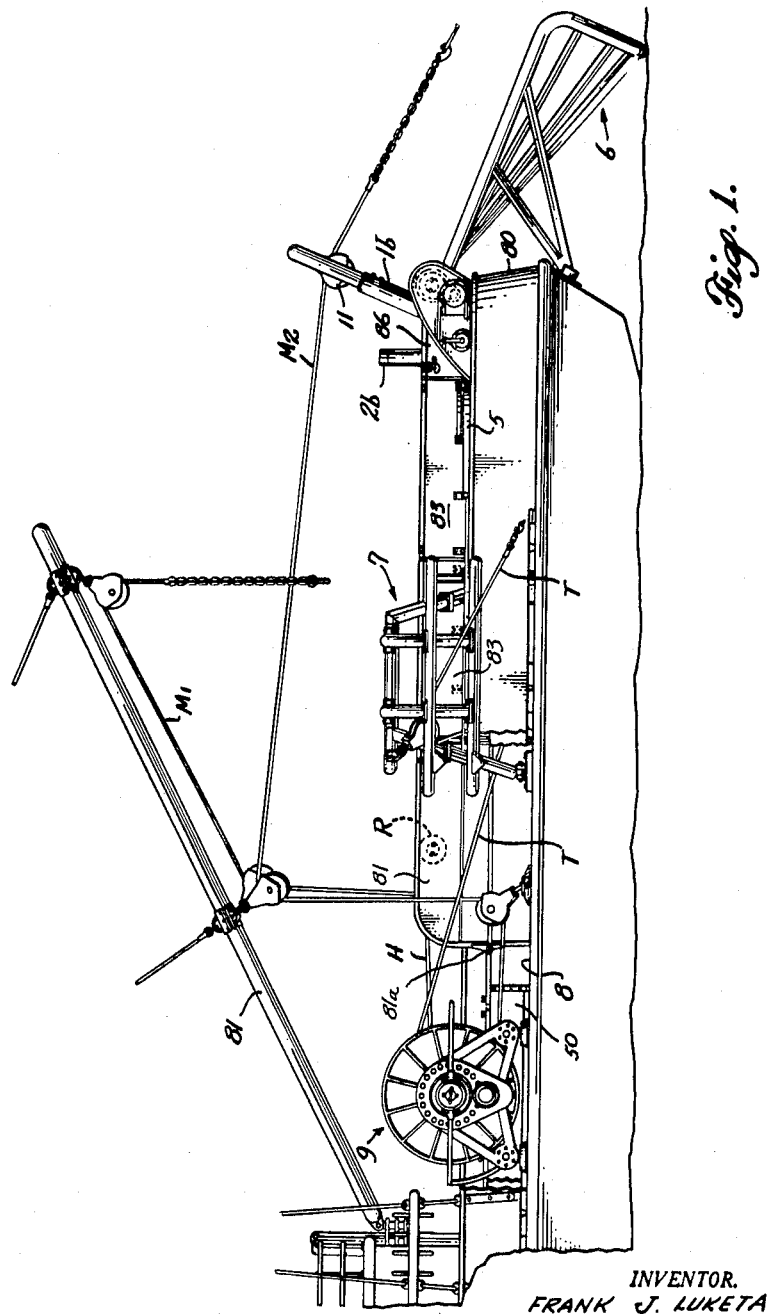
FIGURE 1 is a general side elevational view of the stern portion of a trawler having the mechanisms of this invention installed, part of the near side rail being omitted
Figure 2:
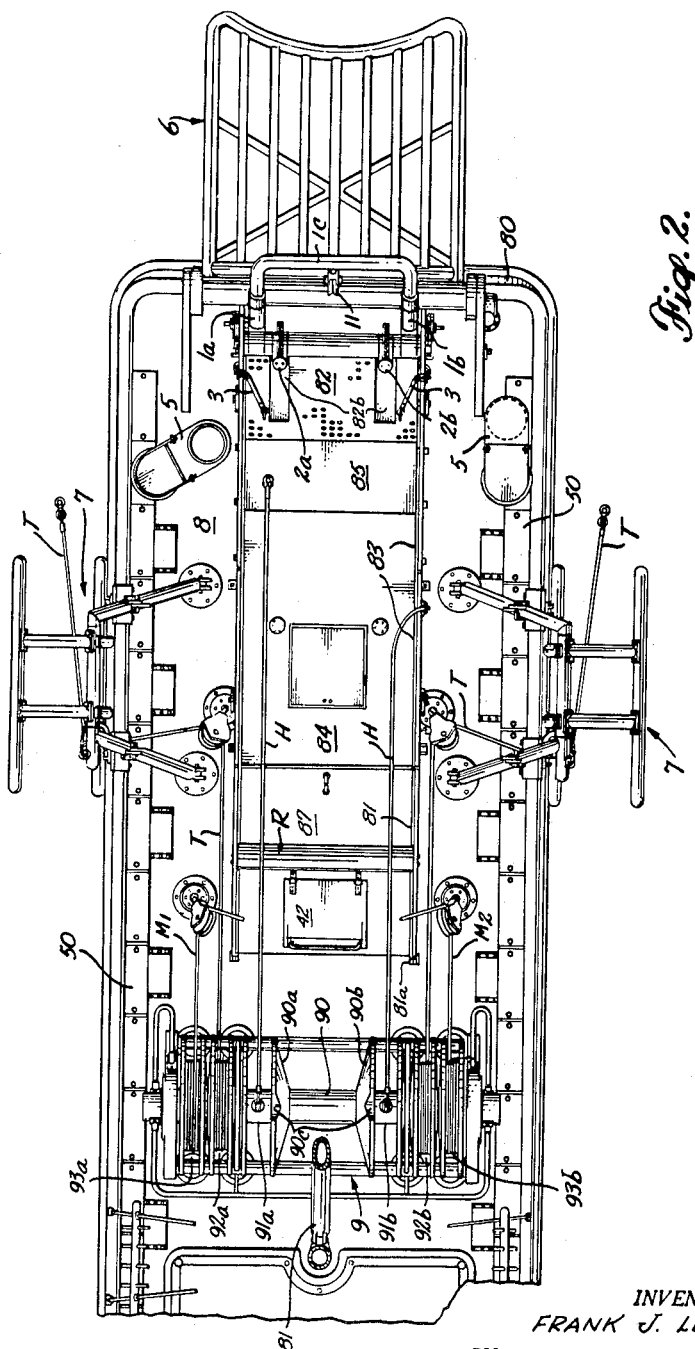
FIGURE 2 is a plan view of the same.

FIGURES 1 and 2 are identical with like figures in the trawler application, and show a winch 9, with the several drums 90, 91a, 91b, 92a, 92b, 93a, 93b, mounted athwartwise on the deck 8 as far forward of the stern 80 of the trawler as the deckhouse will permit. Towing warps T extend from drums 92a, 92b aft and over the sides during trawling to a net (not shown). Hauling lines H on drums 91a, 91b are used in hauling the net, and net elements are transferred from drums 91a, 91b onto central drum 90 through notches 90c in flanges 90a, 90b of this drum 90. Paired posts 1a, 2a, and 1b, 2b upstanding at the stern guide lines and net elements onto drums 91a, 91b respectively, and finally onto drum 90, as explained in the trawler application. Lines M1 and M2 reeved through blocks on the boom 81 are for utility use, or for dragging a trynet which is a small net used to test whether fish are present before setting the main net (as the line M2, through block 11 hung from the bridge piece 1c is doing, although the trynet is not shown). Stanchions 7 secure the doors (not shown) at the after ends of towing warps T. A ramp 6 supports the loaded net as it comes aboard over the stern.

The remaining elements shown and referenced in FIGURES 1 and 2 pertain to the trough of this invention, or to fish handling and segregating mechanism, all of which will be referred to hereinafter. This trough provides a bin of as large capacity, and in particular of as great length, as is practical, wherein the catch is dumped. It is so arrange that all fish gravitate or are moved to a point adjacent two sorters' stations, located between the trough and the opposite bulwarks, where they can be segregated into the different species, and junk fish separated out, the usable fish being delivered into iced stowage bins in the hold. Provision is made for getting rid of junk fish, and after all fish have been disposed of, provision is made for swamping out the trough, that is, hosing or flushing it out, to get rid of mud, rocks, slime, and other debris.

Figure 4:
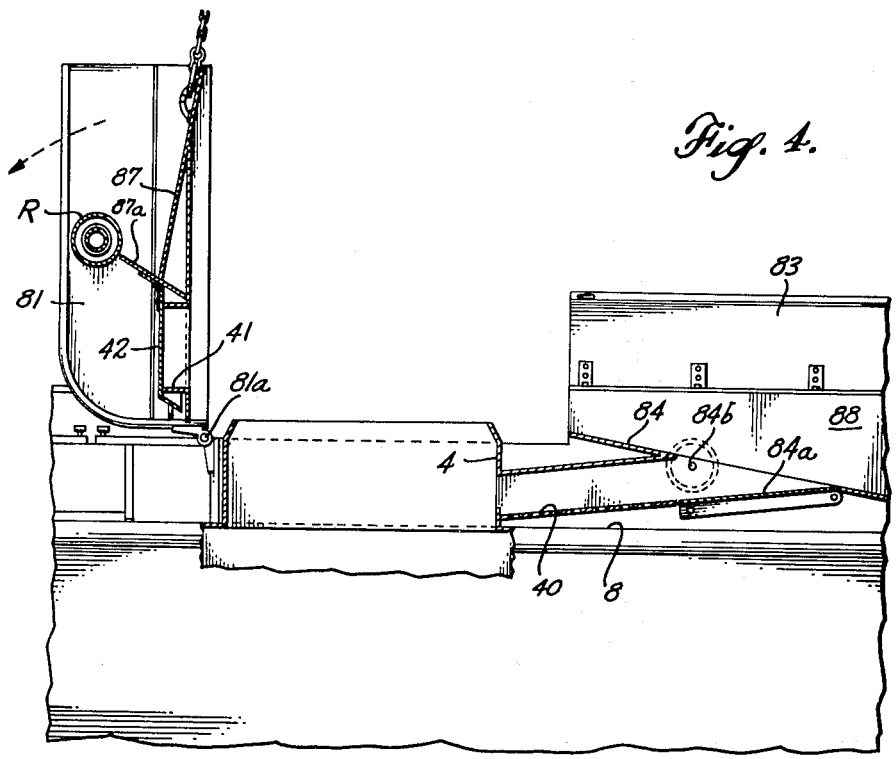
FIGURE 4 is a similar view of the fore part only of such devices, showing the main hatch uncovered for access to the hold space, together with a chute arranged as it would be, to dispose of a midwater catch.
Figure 7:
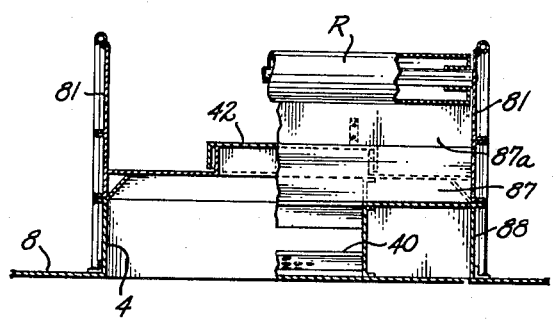
FIGURE 7 is a transverse sectional view substantially at the line 7—7 of FIGURE 3.
Figure 5:
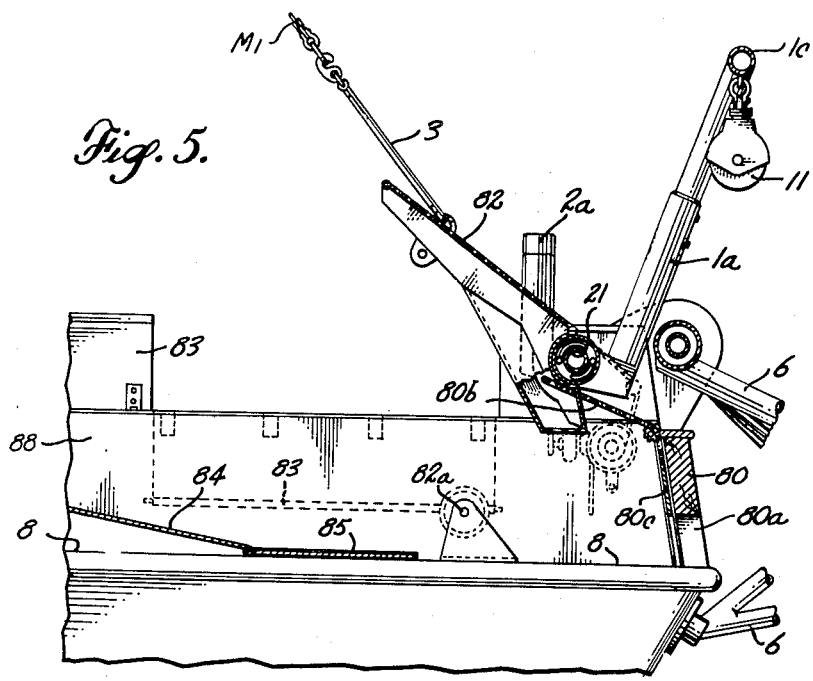
FIGURE 5 is a similar view of the after part only, showing parts arranged for swamping out.

The trough of this invention includes fixed upright walls 88 rising from the deck 8 and extending from the stern forward as far as space permits, in this instance almost to the winch 9. These walls usually have upward extensions at each side, one of which is fixed in position and the others hingedly mounted. The stern section 86 is the one that is fixed in position, and constitutes a support for movable elements of the net guides 1a, 2a, 1b, 2b, and of the trough. The next two forward sections 83 are hingedly mounted, one to swing outwardly and the other to swing inwardly when their use is not required. The extreme forward sections 81 at each side are joined by a roller R which they jointly support, and are hingedly mounted at 81a to swing upwardly and forwardly, as FIGURE 4 shows, for a purpose which will appear hereinafter. The lowest portion of the trough, at about deck level, is defined by a landing 85, preferably of plywood and hence replaceable from time to time, for it will become scarred by the fish pews (spears with single curved points) as the latter engage fish lying upon the landing 85, and if of metal would dull the points of the fish pews.

The purpose of the roller R, elevated well above the deck, is to elevate the forward end of the filled codend, as the net is drawn forwardly by the winch 9, to spill the catch out its after end. Were there no such elevated transverse element the catch would not spill out readily, and it might still be necessary to strap the codend and elevate it repeatedly by a boom fall line, to clear the catch, thereby defeating a part of the advantage to be gained by the drum trawling method. Drawn over the roller, the codend's bottom portion slopes steeply aft and down, and clears automatically. The roller R could be stationary as shown in the drawings, and could be mounted even higher if found necessary, or it could be adjustable, that is, moved upwardly when functioning, then downwardly out of the way when not needed.

Figure 3:
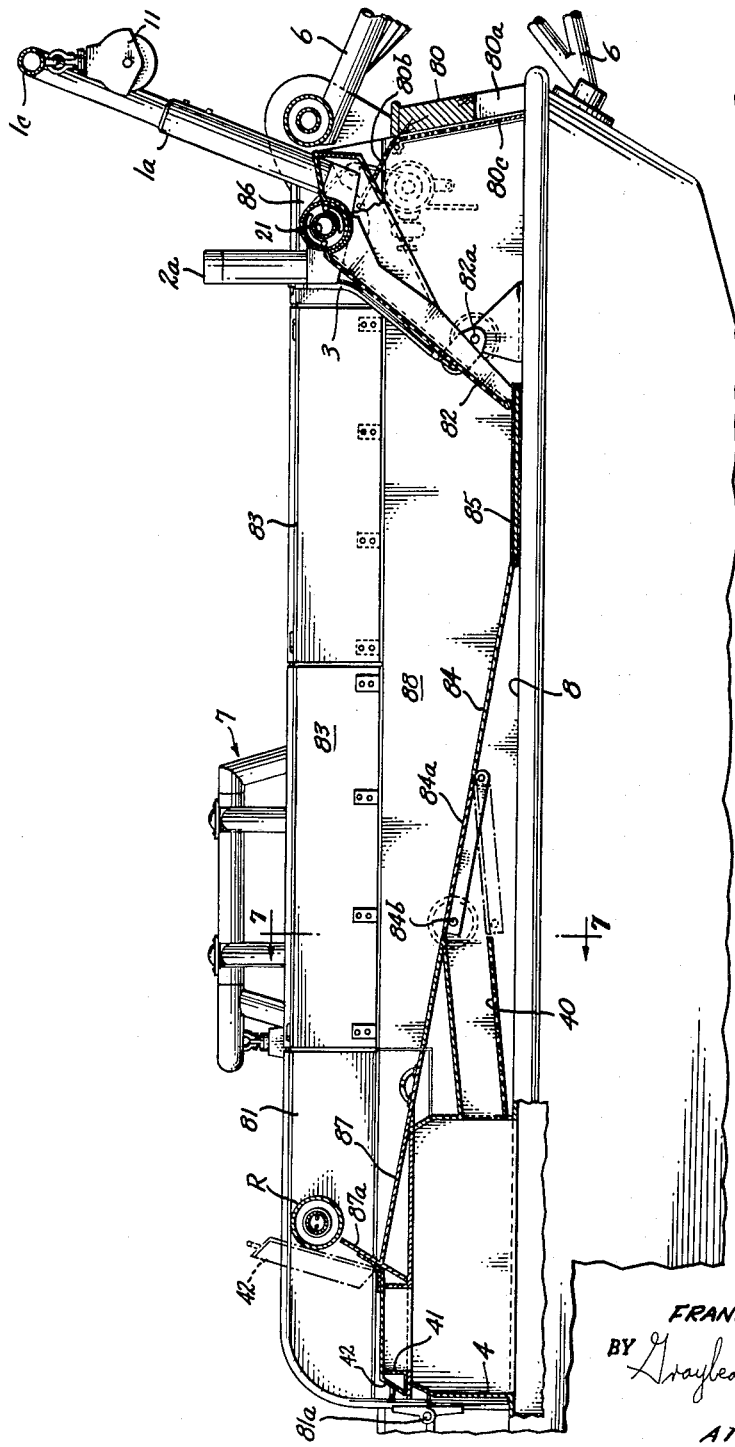
FIGURE 3 is a general longitudinal section on a vertical plane and to a larger scale, of the devices with which this invention is particularly concerned, with parts in position for segregating and distributing a bottom haul.

The remainder of the trough bottom (at least in the form shown in FIGURES 1 to 7) slopes towards the landing 85, and is made up of several different elements. The plate 84 slopes upwardly and forwardly from the landing 85, and adjoins a similarly sloped plate 87 which joins and moves with the hingedly mounted side extensions 81. Together these plates 84 and 87 constitute a sloped forward end wall. The gap between plate 87 and roller R is closed by an upright end plate 87a. The plate 84 has a hingedly mounted closure plate 84a, capable of swinging between the full line position of FIGURE 3 to the dot-dash line position thereof (shown in full lines in FIGURE 4), and in the latter position it affords access by way of inclined chute 40 to a hatch 4, and so into two longitudinal stowage bins below deck (not shown). Bolts 84b retain the closure plate 84a upraised, or permit it to be lowered. At its opposite or stern end the trough is closed during use by the plate 82, which preferably is inclined steeply upwardly and aft, and is perforated.

The hatch 4 is seen to occupy space that is needed for the full length of the trough. The hatch must be of sufficient size to permit entrance and exit of men and of buckets used for efficient discharge of cargo, but this occurs only when the trawler is in port. At sea it is the full length of the trough that is important, and if access through the hatch is necessary at all, it is only to admit a member of the crew to ice the stowed fish within the hold. It is economical, therefore, and conducive to efficiency, to integrate the trough and a hatch cover, and to provide only a crawl hatch 41, with a small cover 42, for access to the hold, and to cover the main hatch 4 with a cover composed of the side extensions 81 and the upper portion 87 of the trough's forward end wall or bottom plate, supplemented by the crawl hatch cover 42. The term "crawl hatch" is self-explanatory, for a crew member must virtually crawl through the same to enter or leave the hold space to ice fish therein.

By thus integrating the trough and the hatch cover, each may be of adequate size, yet extra deck space is not required.

The stern end plate 82 is not fixed in position, but is raisable, as by being hinged at its upper end to rotate about the axis of a transverse shaft 21 supported by the side walls of the trough—specifically, by the fixed extensions 86. It is held down by locking bolts 82a, and anchors one end of snubbers 3, consequently, when the bolts 82a are released and snubbers 3 are engaged by line M1 (see FIGURE 5) the end plate 82 is swung upwardly to clear the deck space astern. The plate 82 can serve as the aft bulwark, or this can be separate from the plate 82. It can be arranged that the action of raising the plate 82 will open a stern scupper 80a, if there is a separate stern bulwark 80, or else the plate 82 becomes a scupper closure. A pair of chains 80b attached at one end to structure of plate 82 pulls upwardly a scupper closure 80c, or movement of the scupper closure 80c may be independent of movement of end plate 82. This enables the entire trough to be swamped out, and various means for so doing are shown, particularly in the diagrammatic views, FIGURES 8, 9 and 10. The plate 82 is perforated, and this is very important, for it permits the mud and slime in the trough to be hosed overboard periodically during the segregation process even before the plate is raised for final swamping out.

In the usual case, after all the catch has been disposed of, trash (or junk) fish, rocks, mud, and like debris from a bottom trawl will remain in the trough, and should go overboard. By raising the perforated plate 82, and closure 80c if one is employed, a stream of water from a hose can be directed lengthwise of the trough to clean it and to wash the debris overboard through the scupper 80a. The hose may be hand-held, although FIGURES 8, 9 and 10 diagrammatically show alternative arrangements. In FIGURE 8 the bottom plate 84 is elevated about a hinge axis 84f to a steeper angle, as by an hydraulic actuator 84c, thereby inducing gravity disposal of the debris, assisted perhaps by a hose stream. In FIGURE 9 the bottom plate 84d is level, increasing the capacity of the trough, and swamping is effected by discharges for permanently installed nozzles N. In FIGURE 10 the bottom 84e is level, and a movable forward end closure 87b is movable lengthwise, and carries a scraper plate 87c bearing along the bottom and pushing the debris aft.

The several arrangements are not only useful in disposing of debris, but also for moving all fish, whether by gravity or by hydraulic jets or by an actual pusher blade, to the landing 85 conveniently to the sorters' stations. Certain arrangements allow the trough to have maximum capacity, and still to advance the fish dumped therein towards the landing 85.

A loaded net is hauled aboard by the drum trawling method, in the manner explained in the aforementioned Patent No. 3,065,562, and is discharged into the trough. Fish tend to gravitate out the now open after end from the roller R. When the net is empty and clear of the trough, and usually after the net has been reset, crew members stationed at a sorter's station or stations on deck at the sides of the trough start disposing of the catch. If the catch was caught by midwater trawling it is likely to be all of one kind of fish and with no debris, hence segregation is not required. In such case the closure plate 84a is dropped from the full-line to the dash-line position of FIGURE 3, and the fish slide or are pushed down the chute 40, through the hatch 4, and into stowage bins (not shown). If the catch was the result of bottom trawling, it is likely to be made up of various kinds of bottom fish, some being junk fish having no commercial value, plus rocks, mud, and debris. In such case the closure plate 84a is left closed, as shown in full lines in FIGURE 3, and crew members at the sorters' stations at opposite sides, adjacent the landing 85, engage the fish with their fish pews. If the catch is large, the side extensions 83 are up, and sorters are elevated above deck; otherwise the extensions are down, and the sorters stand on deck. So far as possible they will select all fish of one kind at a given time, and will toss them into the chutes 5, whence they land on conveyors housed in at 50, and are directed to appropriate bins below deck. Different bins are provided to receive other kinds of fish. Scrap fish are either immediately tossed over the rail, or are permitted to collect on top of the pile. When the junk fish form a top layer too deep to enable ready selection of desired fish, a top gate or gates 82f (see FIGURES 11, 12, 13) hingedly mounted at 82g in plate 82, is unlatched by disengaging spring latch 82h. This gate or gates, of a vertically extending series along the side edges of plate 82, open to the space beneath end plate 82, and the top layer of junk fish is skimmed off with a shovel. Segregation then proceeds as before. After it is completed the skimmed-off fish go out the after scupper 80a along with debris from within the trough. During segregation the crew members so engaged need not move from positions adjacent the landing 85 and the chutes 5, for the slope of the bottom plate 84 (or the alternate systems of FIGURES 9 and 10) brings all fish by gravity to the landing.

Figure 6:
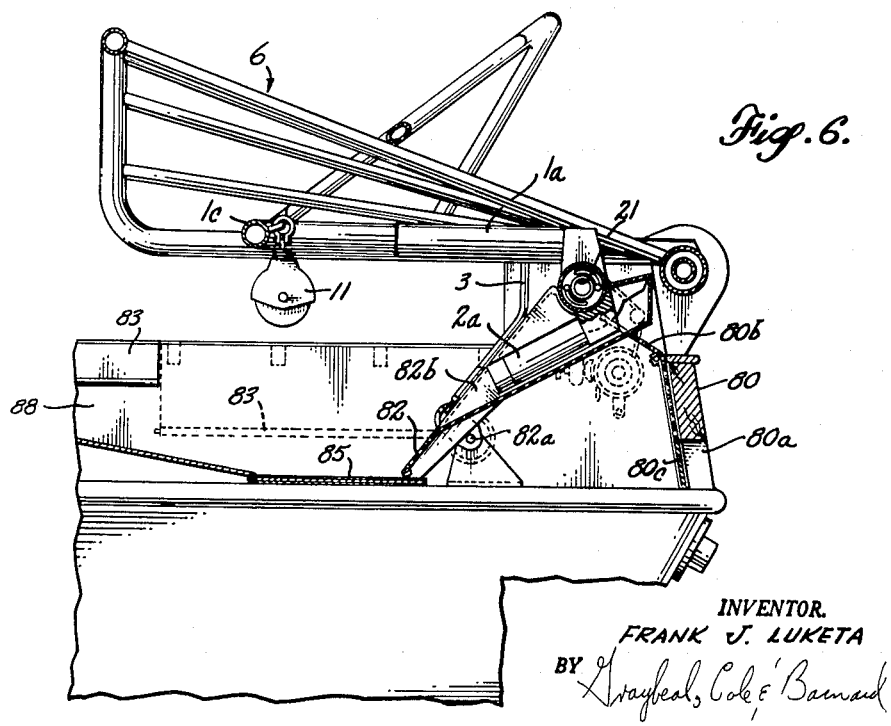
FIGURE 6 is a similar view, also of the after part only, showing the manner in which parts can be stowed while the trawler is under way.

After the catch is disposed of the trough is swamped out, as already described. If the trawler is fully laden, and ready to return to port, the equipment is stowed. FIGURE 6 shows some of it in this stowed position. Extensions 83 are hinged downwardly, the posts 2a and 2b are hinged downwardly into wells 82b in plate 82 provided for them, and posts 1a, 1b, and their bridge bar 1c are swung inboard to a horizontal position, and secured by gravity. The ramp 6 is swung inboard and secured by gravity above the after end of the trough. The plate 82 is down, and the scupper closure 80c is down also, and obstructs entry of any following sea. The trawler can now run for port with her catch.

It should be pointed out here that it is quite feasible, and preferable on some trawlers, for a section of the stern bulwark 80 to be removed and the perforated end wall 82, either shifted back or left in place, to serve a dual purpose, as the stern bulwark as well as the after end wall of the trough. It can even be inclined in the opposite direction, and it could be pivoted to swing outboard around its top edge to enable the debris to be hosed or washed out over the stern.

The real significance or essence of the present invention is that a crew member of a trawler can segregate the catch and dispose of debris and also deposit the retained fish in selected bins in the fish hold, all without moving from his station, in fact, almost without moving his feet—all to the end that the catch can be disposed of rapidly and with a minimum of effort and risk even in heavy weather. This is in sharp contrast to previous practice whereby the catch was rumped, unconfined, on the deck and was allowed to spread over virtually the entire deck. Several shallow walls called "deck checkers" projected up from the deck to minimize the movement of the fluid catch as the trawler rolled and pitched in the sea, but were of little effect. This method necessitated much movement and labor as well as an element of risk on the part of the deck crew, for the crew members were required to be in constant movement as they pewed the fish from one part of the deck and then another, into the hatch, and finally manually shoveled the debris overboard—all while standing on the very slippery deck which was in considerable motion nearly all the time, and in very violent motion during heavy weather.

I claim as my invention:

1. A trough for sorting fish landed upon the deck of a trawler, comprising upright side walls, a bottom landing intermediate the side walls, adjacent one end of the trough, an end wall rising from said landing, an opposite end wall sloping upwardly and forwardly from said landing, said latter end wall having an aperture, a fish chute leading from said aperture to a fish storage space, the bottom whereof is omitted adjacent the end wall, and a closure for said aperture hingedly mounted adjacent the lower edge thereof to swing between a closed position, flush with the end wall, and an open position, in alignment with and closing the omitted part of the bottom of the chute.

2. In a trawler, an elongated trough for sorting fish brought aboard the trawler, said trough comprising a pair of spaced apart, generally upright side walls, a bottom landing intermediate the side walls, adjacent the after end of the trough, an after end wall rising from the landing, an elongated forward bottom plate extending forwardly from said landing, fish-receiving means located adjacent said landing, to receive and disposed of fish which collect at the landing and are there sorted, means for pushing against and in that manner advancing fish and/or debris aft along said forward bottom plate towards the landing, and means on the trawler adjacent the trough for hauling a net over the trough, so that its contents may be emptied into the trough for sorting.

3. A trough as in claim 2, wherein fluid discharge means located at the forward end of said forward bottom plate, and directed aft, constitutes the means for advancing fish and/or debris toward the landing.

4. A trough as and for the purpose stated in claim 2, wherein an upstanding forward wall guided by the side walls for movement aft and forward, and engaging the bottom plate along the lower edge thereof constitutes the means for advancing fish and/or debris that rests upon the bottom plate towards the landing, as the forward wall moves aft.

5. In a trawler, an elongated trough for sorting fish brought aboard the trawler, said trough comprising a pair of spaced apart, generally upright side walls, a bottom landing intermediate the side walls, adjacent the after end of the trough, an after end wall rising from the landing, a forward bottom plate, fish-receiving means located adjacent said landing, to receive and dispose of fish which collect at the landing and are there sorted, said forward bottom plate being hingedly mounted at its after end, adjacent the landing, means for varying the elevation of the forward end of said forward bottom plate, so that such forward end may be raised for causing gravitational movement of fish and/or debris resting thereon towards the landing, and means on the trawler adjacent the trough for hauling a net over the trough, so that its contents may be emptied into the trough for sorting.

References Cited by the Examiner
UNITED STATES PATENTS

| | | | |
|---|---|---|---|
| 230,144 | 7/1880 | Merry | 214—16 |
| 512,680 | 1/1894 | Clarke | 214—15 |
| 922,190 | 5/1909 | Reno | 214—15 |
| 926,122 | 6/1909 | Johnson | 214—15 |
| 1,279,089 | 9/1918 | Dolbear | 214—17 |
| 1,301,390 | 4/1919 | Cook | 114—0.5 |
| 1,429,387 | 9/1922 | Weber | 214—17 |
| 1,616,693 | 2/1927 | Havighorst | 209—122 |
| 1,711,053 | 4/1929 | Gourie | 214—17 X |
| 1,863,989 | 6/1932 | Liisanantti | 114—0.5 |
| 2,573,907 | 11/1951 | Humphreys | 214—15 |
| 2,964,183 | 12/1960 | Matthews | 209—123 |
| 2,997,188 | 8/1961 | Hauser | 214—15 |
| 3,052,354 | 9/1962 | Luketa | 209—123 |

MARVIN A. CHAMPION, *Primary Examiner.*

GERALD M. FORLENZA, *Examiner.*